(12) United States Patent
Lee (10) Patent No.: US 8,511,483 B2
(45) Date of Patent: Aug. 20, 2013

(54) POROUS MEMBRANE AND METHOD OF MAKING THE SAME

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 13/291,935

(22) Filed: Nov. 8, 2011

(65) Prior Publication Data
US 2012/0055879 A1    Mar. 8, 2012

Related U.S. Application Data

(62) Division of application No. 12/202,000, filed on Aug. 29, 2008, now Pat. No. 8,088,439.

(51) Int. Cl.
| | | |
|---|---|---|
| *B01J 35/04* | (2006.01) | |
| *B01J 20/282* | (2006.01) | |
| *B01D 39/20* | (2006.01) | |
| *C01B 39/04* | (2006.01) | |

(52) U.S. Cl.
USPC ............ 210/510.1; 210/653; 210/500.25; 210/321.75; 423/702; 423/709; 502/4; 502/64

(58) Field of Classification Search
USPC ............ 502/4, 64; 423/702, 709; 210/510.1, 210/653, 650, 500.25, 500.1, 321.75
See application file for complete search history.

(56) References Cited

U.S. PATENT DOCUMENTS

| | | | |
|---|---|---|---|
| 5,098,684 A | 3/1992 | Kresge et al. | |
| 5,105,051 A | 4/1992 | Pelrine et al. | |
| 5,134,242 A | 7/1992 | Le et al. | |
| 5,134,243 A | 7/1992 | Bhore et al. | |
| 5,229,341 A * | 7/1993 | Kresge et al. | .................. 502/64 |
| 5,256,360 A | 10/1993 | Li | |
| 5,591,345 A * | 1/1997 | Engelen et al. | ............... 210/640 |
| 5,622,684 A | 4/1997 | Pinnavaia et al. | |
| 5,770,275 A | 6/1998 | Raman et al. | |
| 5,795,559 A | 8/1998 | Pinnavaia et al. | |
| 5,800,799 A | 9/1998 | Pinnavaia et al. | |

(Continued)

FOREIGN PATENT DOCUMENTS

| | | |
|---|---|---|
| JP | 2008-084539 | 4/2008 |
| JP | 2008-276989 | 11/2008 |

(Continued)

OTHER PUBLICATIONS

Kohli et al., DNA-Functionalized Nanotube Membranes with Single-Base Mismatch Selectivity, Aug. 13, 2004, Science, vol. 305, pp. 984-986.*

(Continued)

*Primary Examiner* — David C Mellon
(74) *Attorney, Agent, or Firm* — Knobbe Martens Olson & Bear LLP (57) ABSTRACT

A method of making a porous membrane is disclosed. One such method optionally includes: forming a plurality of pillars in an array form over a substrate; and forming a layer with a mixture of a porous material precursor and a surfactant over the substrate. The method optionally includes removing the pillars to leave cavities in the layer; filling the cavities in the layer with a cavity filler; and removing the surfactant from the layer. The porous membrane can be used as, for example, a sieve for separating molecules from a chemical reaction.

15 Claims, 9 Drawing Sheets

(56) References Cited

U.S. PATENT DOCUMENTS

| | | | |
|---|---|---|---|
| 5,958,367 A | 9/1999 | Ying et al. | |
| 6,027,706 A | 2/2000 | Pinnavaia et al. | |
| 6,117,623 A | 9/2000 | Koshiyama et al. | |
| 6,645,571 B1 | 11/2003 | Takai et al. | |
| 6,695,258 B1 | 2/2004 | Chang | |
| 6,696,259 B1 | 2/2004 | Ibanez et al. | |
| 6,733,828 B2 | 5/2004 | Chao et al. | |
| 7,049,259 B1 * | 5/2006 | Deckman et al. | 502/4 |
| 8,088,439 B2 | 1/2012 | Lee | |
| 2007/0280878 A1 | 12/2007 | Yeung et al. | |
| 2010/0051561 A1 | 3/2010 | Lee | |
| 2011/0033672 A1 | 2/2011 | Yang et al. | |

FOREIGN PATENT DOCUMENTS

| | | |
|---|---|---|
| KR | 10-2007-0040668 | 5/2007 |
| KR | 10-2007-0045431 | 5/2007 |
| WO | WO 03/082803 | 10/2003 |

OTHER PUBLICATIONS

File History of U.S. Appl. No. 12/202,000, filed Aug. 29, 2008.
Ah et al.,"Size-Controlled Synthesis of Machinable Single Crystalline gold Nanoplates," *Chem. Mater.* 17, 5558-5561 (2005).
Beck et al., "A New Family of Mesoporous Molecular-Sieves Prepared with Liquid-Crystal Templates," *Journal of the American Chemical Society*, 114 (27):10834-10843 (Dec. 30, 1992).
Enache et al., "Solvent-free oxidation of primary alcohols to aldehydes using Au-Pd/TiO$_2$ catalysts," *Science*, vol. 311, pp. 362-365 (Jan. 20, 2006).
File History for U.S. Appl. No. 12/202,000, filed Aug. 29, 2008.
Gusev, Vladimir "*Molecule of the Month—MCM-41*" (downloaded from http://www.chm.bris.ac.uk/motm/mcm41/mcm41.htm on Jul. 14, 2008).
Hirsch et al., "Nanoshell-mediated near-infrared thermal therapy of tumors under magnetic resonance guidance," *PNAS*, vol. 100, No. 23, pp. 13549-13554 (Nov. 11, 2003).
Iqbal et al., "Solid-state nanopore channels with DNA selectivity," *Nature Nanotechnology*, vol. 2, pp. 243-248 (Apr. 2007).
Kang et al., "Synthesis of Porous Palladium Superlattice Nanoballs and Nanowires," *Chem. Mater*. 12, 3530 (2000).
Kim et al., "Synthesis of MCM-48 single crystals," *Chem. Commun.*, pp. 259-260 (1998).
Kresge et al., "Ordered Mesoporous Molecular-Sieves Synthesized by a Liquid-Crystal Template Mechanism," *Nature* 359 (6397):710-712 (Oct. 22, 1992).
Lee et al., "Multifunctional Magnetic gold Nanocomposites: Human Epithelial Cancer Detection via Magnetic Resonance Imaging and Localized Synchronous Therapy," *Adv. Funct. Mater.* 258-264 (2008).
Lensveld, D., "On the preparation and characterisation of MCM-41 supported heterogeneous nickel and molybdenum catalysts," (Abstract only downloaded from http://igitur-archive.library.uu.nl on Jul. 14, 2008).
Lin et al., "Structural and Morphological Control of Cationic Surfactant-Templated Mesoporous Silica," *Acc. Chem. Res.*, vol. 35, No. 11, 927-935 (2002).
Lu et al., "Light-Activated Nanoimpeller-Controlled Drug Release in Cancer Cells," *Small*, No. 4, pp. 421-426 (2008).
Maeda et al., "Preparation of mesostructured silica/anodic alumina composite membranes in mild conditions using acetic acid," *Microporous and Mesoporous Materials*, vol. 112, pp. 603-611, (2008).
Martin, "Nanomaterials: A Membrane-Based Synthetic Approach," *Science* 266, 1961 (1994).
Newalkar et al., "Rapid synthesis of mesoporous SBA-15 molecular sieve by a microwave-hydrothermal process," *The Royal Society of Cehmistry 2000; Chem Commun*. pp. 2389-2390 (2000).
Notice of Decision for Patent Dated Jun. 2, 2011, received in Korean Patent Appl No. 10-2008-0123963.
Reddy et al., "Synthesis of Mesoporous Vanadium Silicate Molecular Sieves," *J. Chem. Soc., Chem. Commun.*, pp. 1059-1060 (1994).
Reisman et al., "The Controlled Etching of Silicon in Catalyzed Ethylenadiamine-Pyrocatechol-Water Solutions," *Journal of Electrochemical Society*, vol. 126, pp. 1406-1415 (1979).
Rice et al., "Structural comparison of hexagonally ordered mesoporous thin films developed by dip- and spin-coating using X-ray reflectometry and other quantitative X-ray techniques," *J. Mater. Chem.* 15, 4032-4040 (Jul. 9, 2005).
Ryoo et al., "Synthesis of Highly Ordered Carbon Molecular Sieves via Template-Mediated Structural Transformation," *J. Phys. Chem. B.*, 103, 7745 (1999).
Shin et al., "Template Synthesis of Asymmetrically Mesostructured Platinum Networks," *J. Am. Chem. Soc.* 123, 1246 (2001).
Striemer et al., "Charge- and size-based separation of macromolecules using ultrathin silicon membranes," *Nature* vol. 445, pp. 749-753 (Feb. 15, 2007).
Wu et al., "Orientational Control of Hexagonally Packed Silica Mesochannels in Lithographically Designed Confined Nanospaces," *Angew. Chem. Int. Ed.* 46, 5364-5368 (2007).
Yang et al., "Generalized syntheses of large-pore mesoporous metal oxides with semicrystalline frameworks," *Nature* 396, 152 (1998).
Yang et al., "Mirrorless Lasing from Mesostructured Waveguides Patterned by Soft Lithography," *Science*, vol. 287, pp. 465-467 (2000).
Yu et al., "Fabrication of Ordered Uniform Porous Carbon Networks and Their Application to a Catalyst Supporter," *J. Am. Chem. Soc.* 124, 9382 (2002).

* cited by examiner

POROUS MEMBRANE AND METHOD OF MAKING THE SAME

CLAIM FOR PRIORITY

The present application is a divisional of U.S. application Ser. No. 12/202,000, filed Aug. 29, 2008, issued Jan. 3, 2012 as U.S. Pat. No. 8,088,439, the entire disclosure of which is hereby incorporated by reference herein.

BACKGROUND

Nanotechnology generally refers to a field of technology that controls matter on an atomic or molecular scale (typically 100 nanometers or smaller). Nanotechnology is used e.g., for the fabrication of devices or materials that lie within that scale.

Nanotechnology has recently developed rapidly for various applications in a number of technology fields. Examples of such fields include, but are not limited to, applied physics, materials science, interface and colloid science, device physics, molecular chemistry, self-replicating machines and robotics, chemical engineering, mechanical engineering, biological engineering, and electrical engineering. In certain instances, a structure or material made by nanotechnology can be used in a number of different technology fields.

SUMMARY

An aspect by way of non-limiting example includes a method of making a porous membrane. The method can include: forming an array of pillars over a substrate; and depositing a layer onto the substrate. The layer can include a mixture of a porous material precursor and a surfactant. The mixture can be configured to self-arrange around the arrayed pillars, and the mixture forms pores in the layer.

Another aspect by way of non-limiting example includes an apparatus that can include a first layer having a thickness between about 100 nm to about 1 µm. The first layer can include a plurality of first pores having a first diameter between about 2 nm and about 50 nm. The plurality of first pores can permit fluid and/or molecules having a diameter smaller than the first diameter to pass through the first layer. The apparatus also can include a second layer attached to the first layer. The second layer can include one or more second pores having a second diameter greater than the first diameter. The one or more second pores are aligned to permit the fluid and/or molecules to pass from the first layer through the second layer.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The following detailed description is directed to certain specific embodiments. However, the embodiments can be varied in a multitude of different ways. As will be apparent from the following description, the embodiments may be implemented in or associated with a variety of devices and methods.

The separation of materials often requires large volumes of solvents (e.g., chromatography) and/or time (e.g., distillation, crystallization, etc.). Separation techniques that avoid or minimize solvent usage and/or the amount of time required for the separation can be beneficial, for example, for the environment as well as e.g., for chemical, pharmaceutical and research companies. Some aspects disclosed herein relate to materials and methods for size exclusion of substances, as well to methods of making the materials.

Certain materials can self-arrange into a porous structure by atomic or molecular interaction. Examples of such materials include, but are not limited to, zeolite, anodic aluminum oxide, Mobil Catalytic Material Number 41 (MCM-41), Mobil Catalytic Material Number 48 (MCM-48), and Santa Barbara Amorphous 15 (SBA-15). However, such a porous structure may not have sufficient structural stability or structural organization for use in various applications such as in membrane applications.

Some embodiments described herein relate to porous materials with structural stability and/or organization that can be used for various applications, and to methods for making such porous materials with structural stability and/or organization.

In one aspect, methods of making a porous membrane are provided. The methods can include forming greasy pillars or pillars with a hydrophobic property on a substrate. A mixture of a surfactant and a porous material precursor is deposited on the substrate forming a layer. The pillars can be removed, forming openings in the layer. The openings can be filled with a material for forming a support or with the same mixture of the surfactant and the precursor. The layer can be calcined to form a stabilized porous membrane.

The porous membrane can include pores having a diameter of about 2 nm to about 50 nm. In some aspects the pores can have a uniform size and/or shape. For example, about 50% to about 100% of the pores can have the same general geometric shape, pore size and/or pore diameter. The pores can be modified by attaching molecules to the inner walls of the pores. Such modification can permit additional control of the pore size or diameter.

In certain embodiments, the porous membrane may be attached to a substrate having pores larger than the pores of the porous membrane. In some aspects more than one membrane can be combined to form multi-layer membranes or filter apparatuses.

The porous membrane has a surface and the pores of the membrane can form channels extending generally perpendicular to the surface. For example, the membrane can include vertical pores.

The porous membranes can have various applications. In one embodiment, the porous membrane may be used as a filter or sieve for separation of molecules in, for example, chemical reactions and drug manufacturing.

Porous Membranes and Processes of Making the Same

Figure 1A:
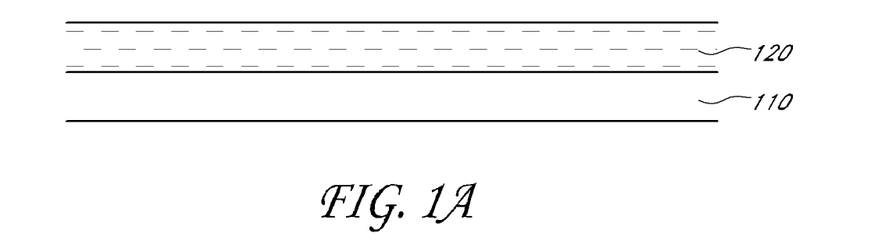
FIGS. 1A-1H show an illustrative embodiment of a method of making a porous membrane structure.

Referring to FIGS. 1A-1H, porous membrane structures and methods of making porous membrane structures according to one or more embodiments will be described below. A substrate 110 is provided, as shown in FIG. 1A. The substrate 110 may be formed of, for example, silicon (Si). In light of the present disclosure, a skilled artisan will appreciate that the substrate 110 may be formed of any other suitable material, such as but not limited to, alumina or glass.

A layer 120 of a greasy material is formed on the substrate 110. The greasy material may be a hydrophobic material. In one embodiment, the greasy material can include an organic compound or polymeric material that has aliphatic chains or aromatic rings. The greasy material may be insoluble in water, alcohol, or other solvents of similar characteristics. In one embodiment, the greasy material may include a photoresist (either positive or negative photoresist) having hydrophobicity.

Figure 1B:
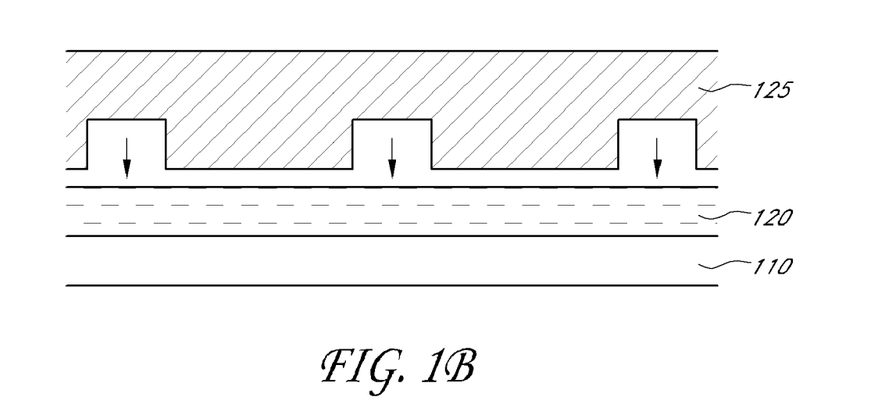
Figure 1C:
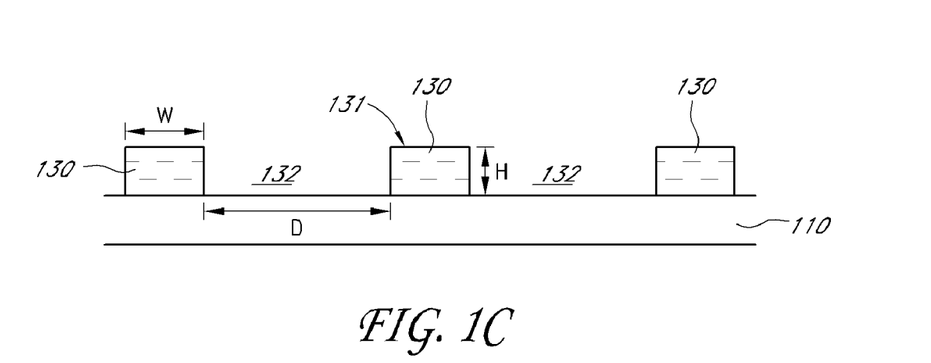
Figure 2A:
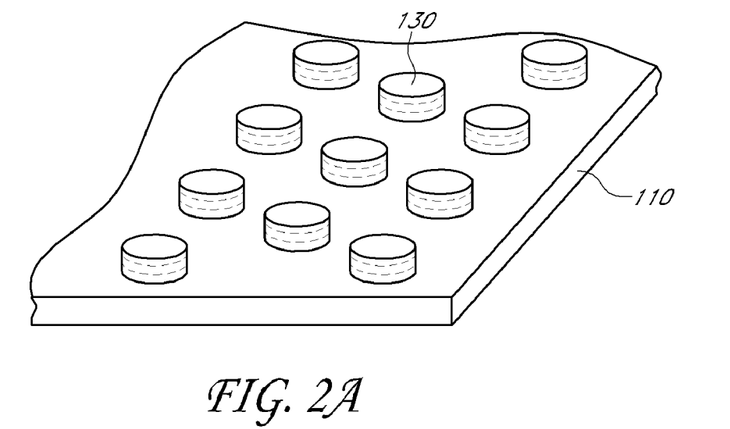
FIG. 2A is a schematic perspective view of an illustrative embodiment of an intermediate porous membrane structure including greasy pillars.

The layer 120 of the greasy material is patterned to form pillars or islands in an array form. The layer 120 can be patterned by, for example, stamping or imprinting methods, as shown in FIG. 1B. In the illustrated embodiment, the layer 120 is shaped by pressing a mold 125 against the layer 120. The mold 125 can be formed of any suitable material, such as a metallic material or a plastic material. A skilled artisan will appreciate that the greasy material can be patterned by any other suitable methods including but not limited to, for example, photolithography. Examples of a resulting structure having pillars 130 on the substrate 110 are shown in FIGS. 1C and 2A.

The pillars 130 may have an average height H, for example, of about 100 nm to about 1 μm, or optionally about 100 nm to about 500 nm. The average height H can be, for example, about 250 nm or about 400 nm. Each of the pillars 130 has a top surface 131 that has a diameter or a width W, for example, of about 100 nm to about 10 μm, or optionally about 150 nm to about 1 μm. The width W can be, for example, about 250 nm, or about 400 nm. The top surfaces 131 of the pillars 130 can have various shapes, such as but not limited to a circular shape, a hexagonal shape, a square shape, etc. The widths W of the top surfaces of the pillars 130 can vary widely, depending on the resolution of the stamping or imprinting methods that are described above for making the pillars 130. The pillars 130 can have a gap or space 132 between pillars. A distance D between neighboring pillars 130 may be, for example, about 100 nm to about 50 μm, or optionally about 100 nm to about 10 μm. The distance D can be, for example, about 200 nm or about 1 μm. In some aspects, about 50% to about 100% of the pillars can be spaced by about 100 nm to about 1 μm from adjacent pillars, for example.

Figure 2B:
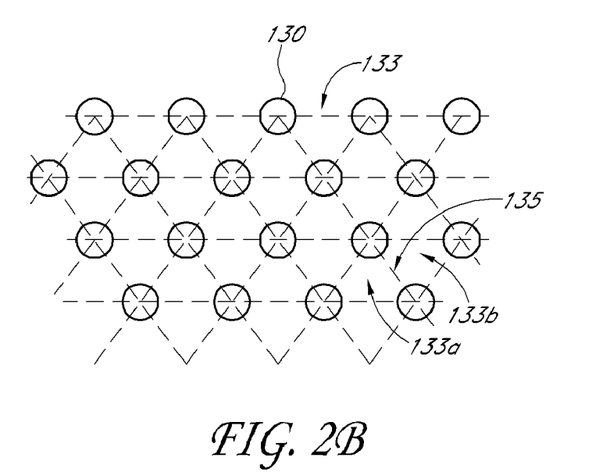
FIG. 2B is a top plan view of the intermediate porous membrane structure of FIG. 2A.

The pillars 130 can be arranged on the substrate 110 in a repeating and/or uniform pattern, as well as a non-uniform, irregular, and/or random pattern. The pattern can be, for example, a geometric pattern that includes two or more rows of pillars. The pattern may also include two or more columns of pillars. In other embodiments, the pattern may include two or more diagonal lines of pillars. In the illustrated embodiment, the pillars 130 form a repeating triangular pattern, where the pillars 130 are positioned at the corners of imaginary triangles 133, as shown in FIG. 2B. Two adjacent imaginary triangles 133 share the same edge. For example, a first imaginary triangle 133a share an edge 135 with a second imaginary triangle 133b that is adjacent to the first imaginary triangle 133a. In another embodiment, the pillars 130 may be arranged in a matrix form. In view of this disclosure, a skilled artisan will appreciate that the pillars 130 can be arranged in any particular pattern that can influence or determine the characteristics of the pores, for example, the pore size, pore shape, spacing, etc.

Figure 1D:
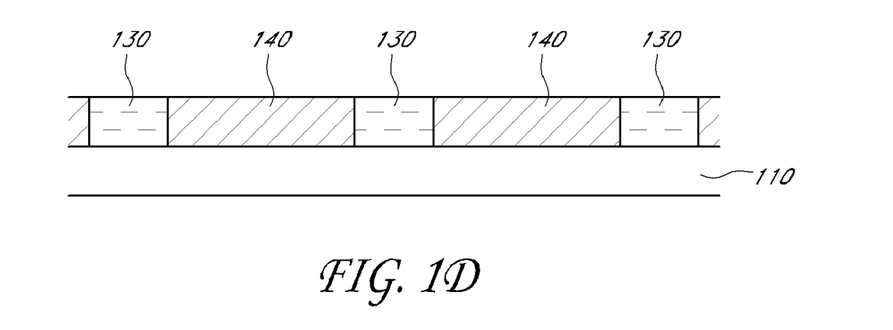
Figure 1E:
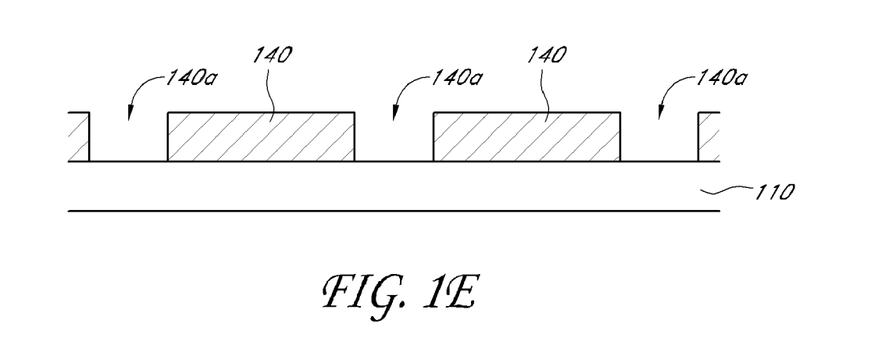

A mixture of one or more porous material precursors and one or more surfactants can be deposited onto exposed portions of the substrate 110, that is, into the spaces 132 between and around the pillars 130 (in contact with the pillars 130), forming a layer 140, as shown in FIG. 1D. The mixture can be poured over the substrate 110. It should be noted that in some aspects the mixture can be poured on and around the pillars. In such cases, the mixture can be removed from the pillars. The layer 140 can have a thickness, for example, between about 100 nm to about 1 μm, or optionally between about 100 nm and about 500 nm. The thickness can be, for example, about 250 nm or about 400 nm. The one or more precursors and the one or more surfactants may interact with one another, and form a porous structure.

In some aspects, the mixture can be spin-coated onto the substrate 110. The mixture can also include an organic solvent (for example, alcohol, ether, dimethylformamide (DMF), or dimethol) and/or water in which the mixture can be dissolved. In view of the instant disclosure, a skilled artisan will appreciate that the mixture can include any other suitable materials. Examples of such materials include, but are not limited to, organic compounds, polymers, metals (for example, Ni, Pt, Pd, Au, Ag, Ru, Os, Rh, Ir, or an alloy of two or more of the foregoing), or metal oxides (for example, nickel oxide or molybdenum oxide).

In one embodiment, the porous material precursor may include, but is not limited to, for example, metal oxide (for example, titanium oxide ($TiO_2$), zirconium oxide ($ZrO_2$), niobium oxide ($Nb_2O_5$), or silicon-aluminum oxide ($SiAlO_{3.5}$), or silicate. Examples of silicate include, but are not limited to, tetraethylorthosilicate (TEOS) or sodium silicate. In other embodiments, metal chloride (for example, $TiCl_4$) can be used as a precursor.

In one embodiment, the surfactant may be a neutral surfactant. In other embodiments, the surfactant may be an ionic (cationic or anionic) surfactant. In certain embodiments, the surfactant may be a gemini surfactant that includes two surfactant moieties (portions), linked together by a spacer unit (for example, two, three, four or more methylene groups).

The surfactant may include one or more hydrophobic groups. In some embodiments, the surfactant may be an amphiphilic compound or polymer that possesses both hydrophobic and hydrophilic groups. The hydrophobic group can be, for example, a large hydrocarbon moiety, such as a long chain in the form of $CH_3(CH_2)_n$, where n is an integer greater than 4 (and optionally less than about 30). The hydrophilic group can be either a charged group or an uncharged group. The charged group can be anionic or cationic.

Examples of surfactants include, but are not limited to, cetyltrimethylammonium bromide (CTAB), alkyltrimethylammonium bromide ($C_n$TMAB; where n is an integer equal to or greater than 14), P123 polymer, or F127 polymer (available from BASF, Parsippany, N.J.). P123 polymer is poly (ethylene oxide)-poly(propylene oxide)-poly(ethylene oxide) ($EO_{20}PO_{70}EO_{20}$; molecular weight=5800) which is a tri-block co-polymer that can be represented by Formula 1.

$HO(CH_2CH_2O)_{20}(CH_2CH(CH_3)O)_{70}(CH_2CH_2O)_{20}H$     Formula 1

In one embodiment, the mixture can include, for example, $TiO_2$ or $TiCl_4$ as a precursor, and P123 polymer as a surfactant. The mixture may also include an alcohol that dissolves the precursor and the surfactant.

In another embodiment, the mixture can include materials for forming Mobil Catalytic Material Number 41 (MCM-41). In such an embodiment, the mixture can include sodium silicate or tetraethylorthosilicate (TEOS) as a precursor. The mixture can also include CTAB, $C_{14}$TMAB, and/or $C_{18}$TMAB as a surfactant. In one embodiment, the mixture can be prepared by processes described in Lin et al., "Structural and Morphological Control of Cationic Surfactant-Templated Mesoporous Silica," Accounts of Chemical Research, Vol. 35, No. 11, 927-935, 2002, the disclosure of which is incorporated herein by reference in its entirety. In another embodiment, the mixture can be prepared by processes described in Beck et al., "A New Family of Mesoporous Molecular-Sieves Prepared With Liquid-Crystal Templates," Journal of The American Chemical Society 114 (27), 10834-10843 (Dec. 30, 1992), the disclosure of which is incorporated herein by reference in its entirety. In yet another embodiment, the mixture can be prepared by processes described in Kresge et al., "Ordered Mesoporous Molecular-Sieves Synthesized By a Liquid-Crystal Template Mechanism," Nature 359 (6397), 710-712 (Oct. 22, 1992), the disclosure of which is incorporated herein by reference in its entirety. In other embodiments, the mixture can be prepared by any of the processes described in U.S. Pat. No. 5,098,684; No. 5,105,051; No. 5,134,242; and No. 5,134,243, each of the disclosures of which is incorporated herein by reference in its entirety. A skilled artisan will appreciate that a mixture of any suitable materials for forming MCM-41 can be used to form the layer 140.

In another embodiment, the mixture can include materials for forming Santa Barbara Amorphous 15 (SBA-15). For example, in such an embodiment, the mixture may include tetraethylorthosilicate (TEOS) as a precursor, and P123 polymer as a surfactant. In one embodiment, the mixture can be prepared by processes described in Newalkar et al., "Rapid Synthesis of Mesoporous SBA-15 Molecular Sieve by a Microwave-Hydrothermal Process," The Royal Society of Chemistry 2000, Chem. Commun, 2000, 2389-2390, which is incorporated herein by reference in its entirety. A skilled artisan will appreciate that a mixture of any suitable materials for forming SBA-15 can be used to form the layer 140.

The mixture self-arranges into a porous structure, providing the layer 140 with porosity. The layer 140 may have meso-pores. The term "meso-pores" generally refer to pores having a diameter of about 2 nm to about 50 nm. In other embodiments, the layer 140 may have pores having a diameter between about 2 nm and about 10 nm. The average diameter of the pores can be, for example, about 3 nm or about 7 nm. The diameter of the pores may vary, depending on, for example, the size of the surfactant.

Figure 3A:
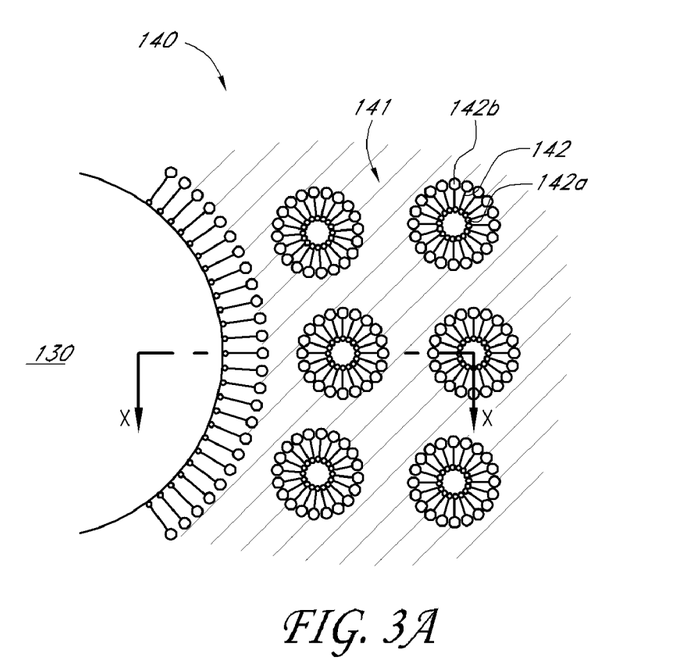
FIG. 3A is a schematic diagram of an illustrative embodiment of an intermediate porous membrane structure including greasy pillars and a porous material.
Figure 3B:
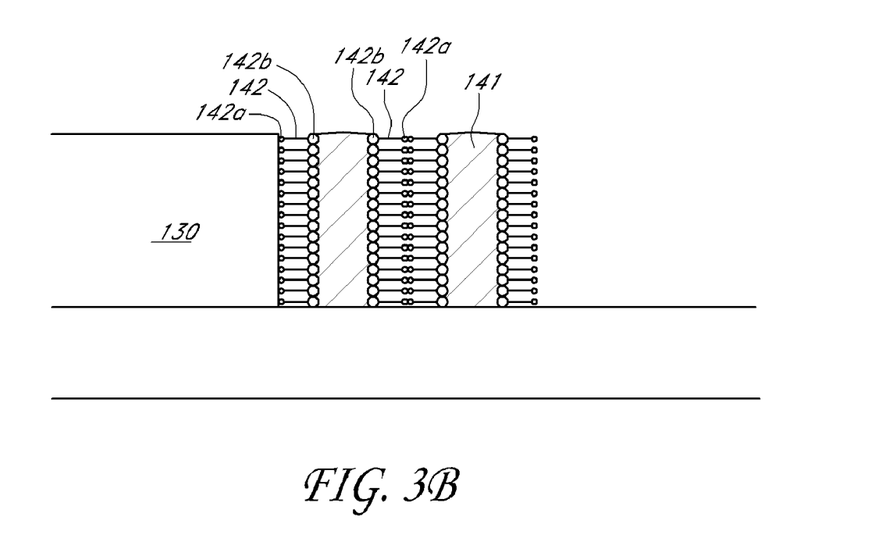
FIG. 3B is a cross-section of the membrane structure of FIG. 3A, taken along the line X-X.

FIG. 3A is a schematic diagram of an illustrative embodiment of an intermediate porous membrane structure including greasy pillars and a porous material. FIG. 3B shows a cross-section of the membrane structure of FIG. 3A, taken along the line X-X in FIG. 3A. Referring to FIGS. 3A and 3B, each of surfactant molecules 142 in the layer 140 may include a hydrophobic group 142a and a hydrophilic group 142b. The hydrophobic groups 142a of surfactant molecules 142 around the pillars 130 are self-arranged close to the pillars 130. The hydrophilic groups 142b of the surfactant molecules 142 are self-arranged away from the pillars 130. The hydrophilic groups 142b of other surfactant molecules 142 in the layer 140 form structures, for example, in this case depicted as cylindrical structures, between the pillars 130, enclosing the hydrophobic groups 142a such that the hydrophobic groups 142a are inside the cylindrical structures. The porous material precursor 141 fills the gaps that are in between the adjacent cylindrical structures.

Figure 4A:
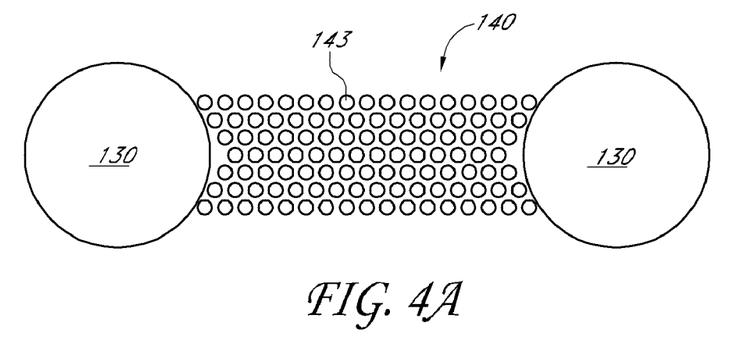
FIG. 4A is a top plan view of an illustrative embodiment of an intermediate porous membrane structure including greasy pillars and a porous layer.
Figure 4B:
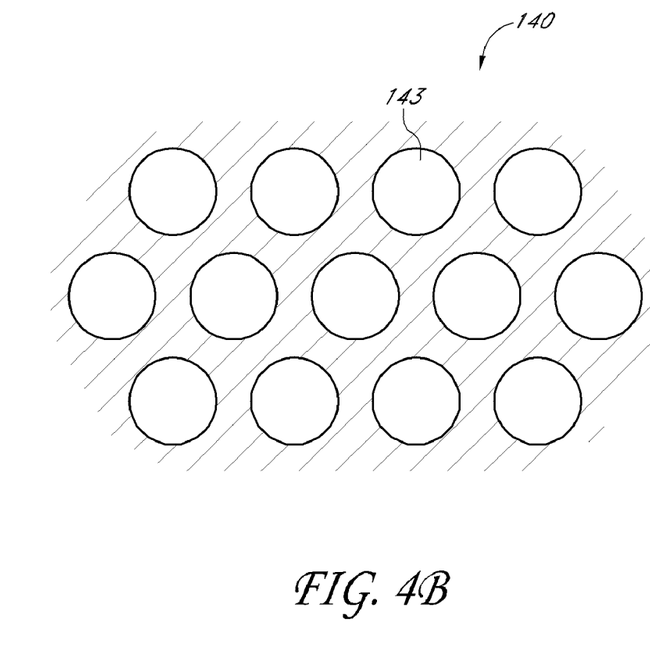
FIG. 4B is an enlarged top plan view of the porous layer of FIG. 4A.

The self-arranged or self-assembled surfactant produces a structure that permits the formation of pores or channels 143 in the layer 140, as shown in FIG. 4A, which is a top plan view of a structure. The pores 143 can have a circular structure, for example, as shown in FIG. 4B. The pores may be packed in a hexagonal pattern.

Referring back to FIG. 1E, the pillars 130 can be at least partially removed, leaving cavities 140a in the layer 140. In one embodiment, the pillars 130 can be removed by dissolving them by any suitable method, such as but not limited to using a solvent that can dissolve the greasy material. Examples of solvents are disclosed in U.S. Pat. No. 6,117,623; Angew, Chem. Int. Ed. 2007, 46, 5364-5368; and Yang et al., Science 2000, 287,465, the disclosures of which are incorporated herein by reference in their entireties.

Figure 1F:
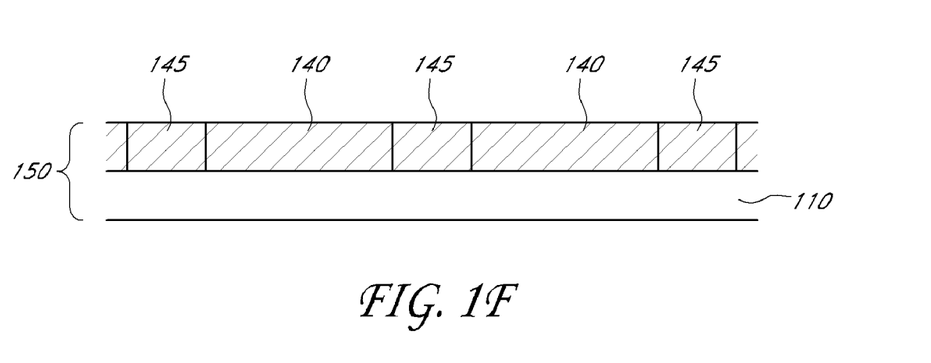

The cavities 140a may be filled with a cavity filler 145, as shown in FIG. 1F. In the context of this document, the term "cavity filler" refers to a material filling the cavities 140a. In FIG. 1F the cavity filler 145 is depicted as the same material or mixture as was used to form the layer 140. In other embodiments, the cavity filler 145 may be a material or a mixture of materials that is different from the mixture that forms the layer 140. In such embodiments, the material or mixture of materials may be selected to form support structures (for example, posts or pillars) in the cavities 140a. Examples of such materials include, but are not limited to, precursors of silicon oxide ($SiO_2$) such as but not limited to titania ($TiO_2$) or alumina ($Al_2O_3$).

Figure 1G:
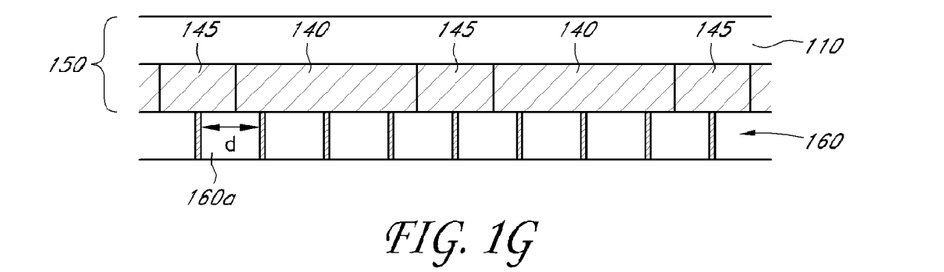

In some embodiments, the porous membrane structure 150 resulting from the step described above with reference to FIG. 1F is transferred onto a support substrate 160, as shown in FIG. 1G. The illustrated support substrate 160 includes macro-pores 160a, which have a diameter d of about 50 nm to about 10 μm, for example. In other embodiments, the support substrate 160 may have pores having a diameter between about 50 nm and about 500 nm. The average diameter of the pores of the support substrate 160 can be, for example, about 100 nm, or about 300 nm. The density of the macropores 160a can be between about 30% and about 70%, or optionally between about 40% and about 60%. The density of the macropores 160a can be, for example, 40% or 50%. Such a support substrate 160 can be formed by, for example, anodic aluminum oxide. The support substrate 160 can provide structural stability to the porous membrane structure 150 while minimally blocking, if at all, the pores of the porous membrane structure 150.

Figure 1H:
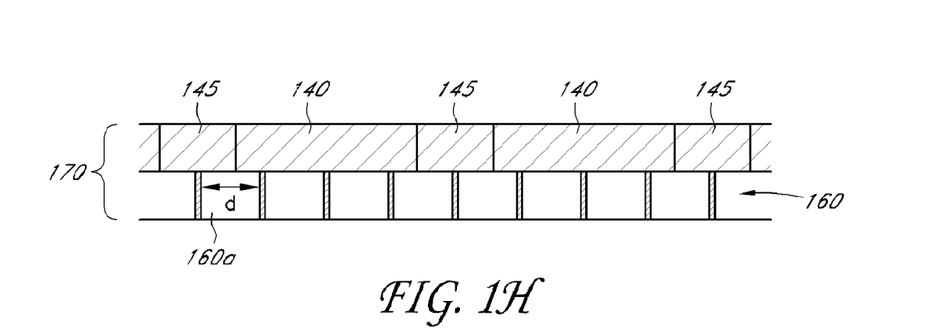

The substrate 110 of FIG. 1G can be removed by any suitable method, resulting in, for example, the structure shown in FIG. 1H. In one embodiment, the substrate 110 can be removed by any suitable etchant, such as for example, ethylenediamine pyrocatechol (EDP). One example of an etching process is described in Reisman et al., Journal of Electrochemical Society, 1979, Vol. 126, pp. 1406-1415, the disclosure of which is incorporated herein by reference in its entirety.

The layer 140 and optionally the cavity filler 145 may be solidified. In one embodiment, the intermediate structure 170 shown in FIG. 1H can be heated to subject the mixture forming the layer 140 and the cavity filler 145 to calcination. The term "calcination" generally refers to a thermal treatment process to bring about one or more of a thermal decomposition, reduction in moisture, reduction, oxidation, phase transition, and/or removal of a volatile material. This calcination process can remove the surfactant, leaving through-holes in the layer 140.

In one embodiment, the intermediate structure 170 may be heated to about 450° C. to about 550° C. under oxygen atmosphere. A skilled artisan will appreciate that the temperature can vary widely, depending on the material that is being calcined. For example, the temperature can be below the melting point of the material. During this step, the surfactant in the mixture can be removed by, for example, decomposition. In other embodiments, the calcination described above may be performed earlier than the step described in connection with FIG. 1G.

Figure 5A:
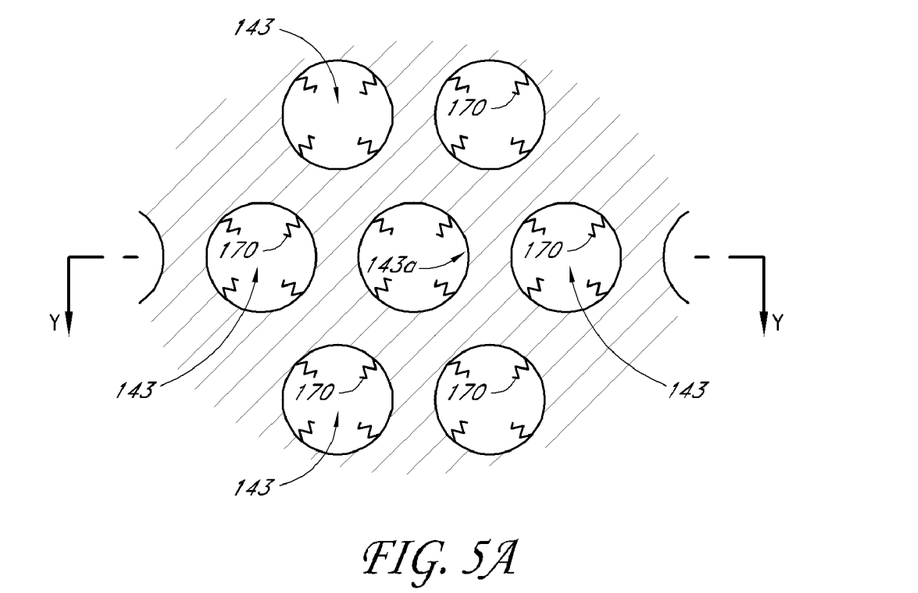
FIG. 5A is a top plan view of an illustrative embodiment of a porous membrane having pores with a reduced pore size.
Figure 5B:
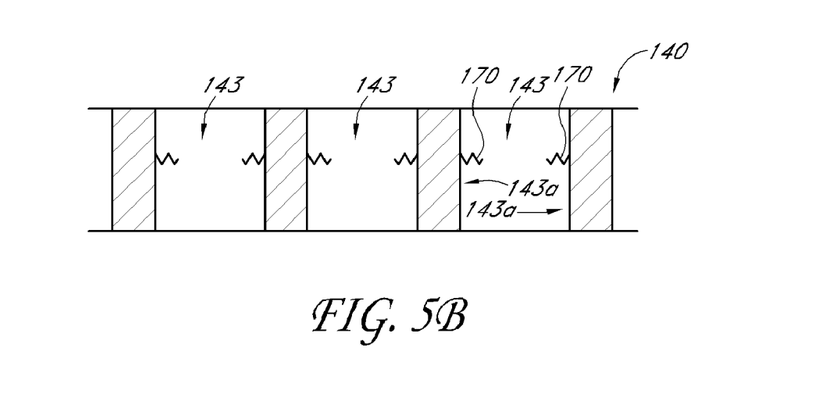
FIG. 5B is a cross-sectional view of the porous membrane of FIG. 5A, taken along the line Y-Y.

In other embodiments, the size of the pores of a porous membrane can be modified. FIG. 5A is a top plan view of an illustrative embodiment of a porous membrane having pores modified with molecules. FIG. 5B is a cross-sectional view of the porous membrane of FIG. 5A, taken along the line Y-Y in FIG. 5A. Referring to FIGS. 5A and 5B, a porous membrane 140 includes pores 143 having an inner surface 143a. The inner surface 143a of the pores 143 of the porous membrane 140 can have pore size-reducing molecules 170. The size of the resulting pores can be measured by gas adsorption isotherm experiments, for example.

In one embodiment, the pore size-reducing molecules 170 can be, for example, a hairpin DNA. In another embodiment, the pore size-reducing molecules 170 can be, for example, a compound including an alkoxide group represented by —OR, wherein R is a straight or branched C1-C30 alkyl group. In yet another embodiment, the pore size-reducing molecules 160 can be, for example, a compound having an —Si—OR group, wherein R is a straight or branched C1-C30 alkyl group.

In certain embodiments, first DNA sequences can be attached to the inner surface 143a of the pores 143, using functional groups such as those described above. Second DNA sequences having base pairs matching those of the first DNA sequences are hybridized with the first DNA sequences. The second DNA sequences can have various lengths and can be detached from the first DNA sequences by heating. In such embodiments, the pore size can be varied as desired, depending on the needs, by hybridizing a second DNA sequence with a desired length according to the particular needs.

An example pore size reduction method using DNA sequences is described in Lu et al., "Light-Activated Nanoimpeller-Controlled Drug Release in Cancel Cells," SMALL, 2008, 4, No. 4, 421-426, the disclosure of which is incorporated herein by reference in its entirety. Another example pore size reduction method is described in Iqbal et al., "Solid-State Nanopore Channels with DNA Selectivity," Nature Nanotechnology, Vol. 2, April 2007, 243-248, the disclosure of which is incorporated herein by reference in its entirety.

In certain embodiments, various metal complexes can be fixed to the inner surface 143a of the pores 143 for use of the membrane as a catalyst for hydrogenation, dihydroxylation, a coupling reaction (for example, Heck coupling reaction, Suzuki coupling reaction, etc.), or the like. In one embodiment, such metal complexes can be attached to the inner surface 143a, for example, using suitable linkage molecules, such as an organic ligand that can be represented by R'—Si—(OR)$_3$, where R' is one of organic ligands including an oxygen atom (O), a nitrogen atom (N), a phosphorus atom (P), and/or a sulfur atom (S), and R is an alkyl group.

Figure 6A:
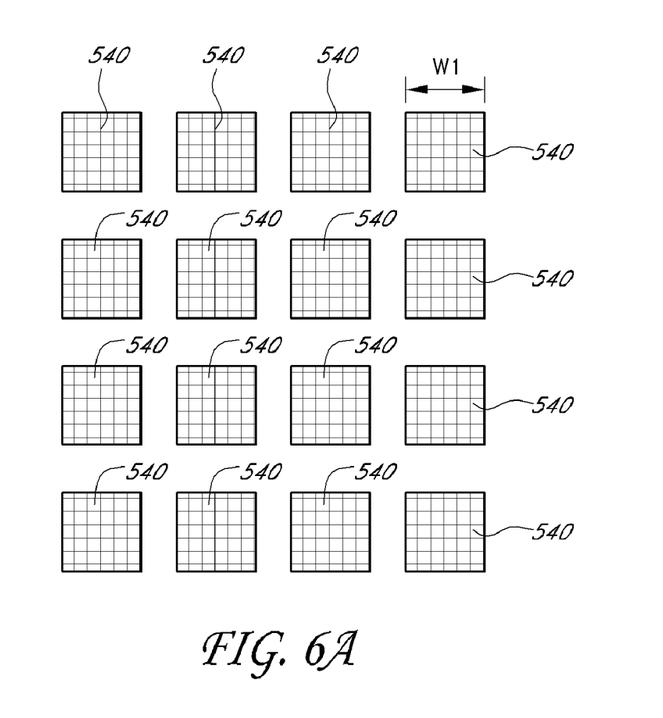
FIGS. 6A and 6B show an illustrative embodiment of a method of making a porous membrane structure.

Referring to FIGS. 6A and 6B, porous membrane structures and methods for making the same according to one or more embodiments will be described. First, two or more small-size porous membranes 540 are provided. The small-size membranes may be formed, for example, by any of the embodiments described herein, including the methods described in connection with FIGS. 1A-1H and/or FIG. 5. The small-size membranes 540 can have any shape, including a square, a rectangular, or a triangular shape, for example, as shown in FIG. 6A. The small-size membranes can be of any suitable size. In one embodiment, each of the small-size membranes 540 may have a first width W1, for example, of about 0.5 cm, or about 2 cm, for example. In other embodiments, the first width W1 can be, for example, between about 1 cm and about 5 cm, or optionally between about 2 cm and about 3 cm.

Figure 6B:
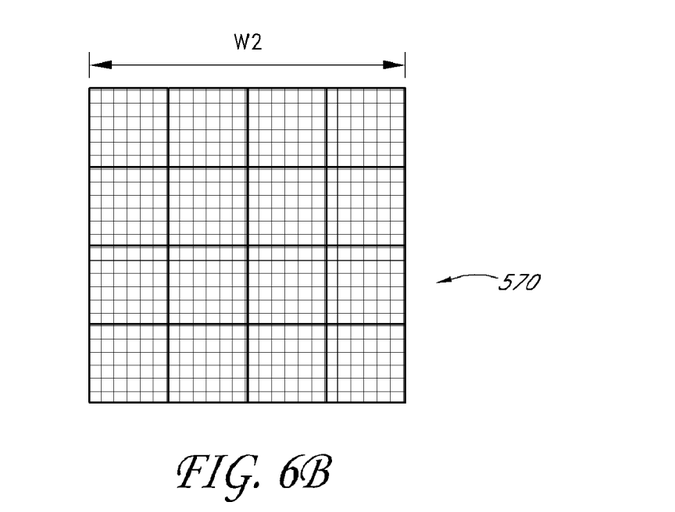

The small-size membranes 540 may be attached to one another to form a large-size membrane 570, as shown in FIG. 6B. The membranes 540 may be attached side by side to one another to form a larger membrane. The membranes may be attached, for example, using an adhesive, such as epoxy. The large-size membranes can be made in any size. For example, the large-size membrane 570 may have a second width W2, for example, between about 2 cm and about 30 cm, or optionally between about 5 cm and about 20 cm. The second width W2 can be, for example, about 5 cm or about 15 cm. In view of the instant disclosure, a skilled artisan will appreciate that the sizes and shapes of the small-size and large-size membranes can vary widely. Also, in some aspects, two or more such membranes 540 or 570 that have the same or different size pores can be stacked onto each other, such that they contact each other.

Application of Porous Membranes

The porous membranes or membrane structures described above, or made by the methods described above can have various applications. In one embodiment, the porous membranes may be used as a filter or sieve for separating molecules. In certain instances, a chemical reaction may produce compounds or molecules of different sizes. In some chemical reactions, certain resulting molecules have a size that cannot go through the pores of the porous membrane described above while other molecules may be small enough to pass the pores. Details of use of a porous membrane as a molecular sieve for molecule separation are disclosed in Striemer et al., "Charge- and Size-Based Separation of Macromolecules Using Ultrathin Silicon Membranes Nature, Vol. 445, pp. 749-753, Feb. 15, 2007, the disclosure of which is incorporated herein by reference in its entirety.

Figure 7:
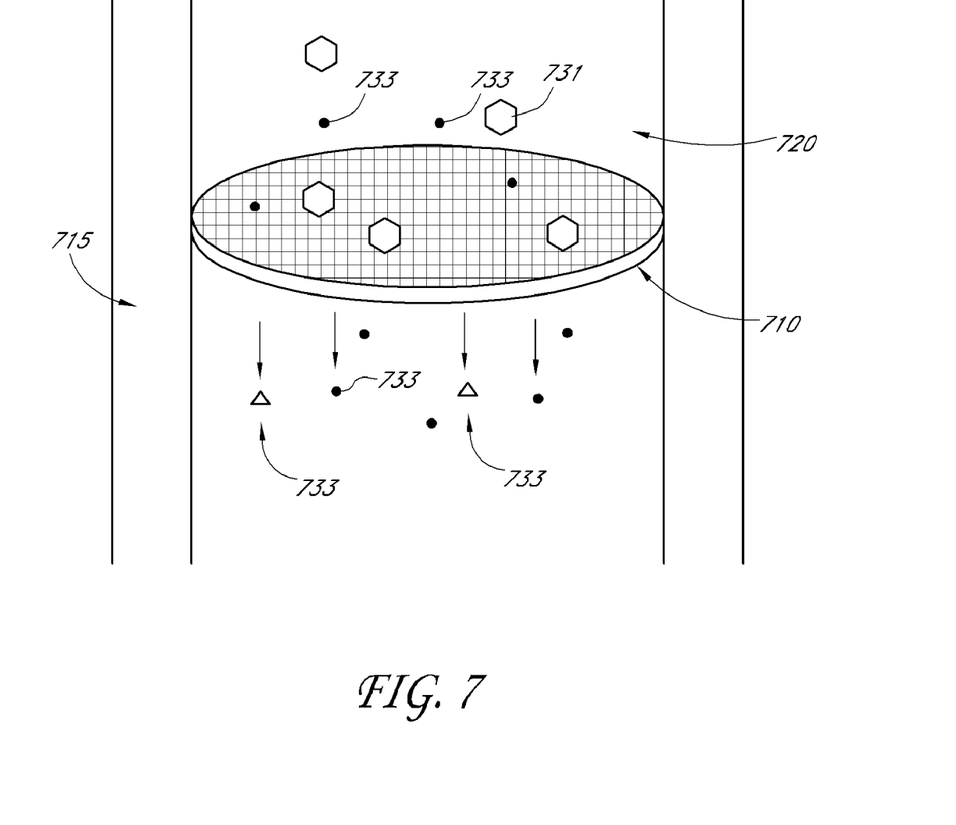
FIG. 7 is a schematic diagram of an illustrative embodiment of a method of separating molecules using a porous membrane.

Referring to FIG. 7, a method for separating molecules according to one embodiment is described below. In the illustrated embodiment, a pipe or tube 715 provides a conduit 720 for a fluid, such as but not limited to a solution or dispersion resulting from a chemical reaction. The pipe 715 includes a porous membrane 710 that is positioned substantially perpendicular to a flow of the fluid. The details of the porous membrane 710 can be as described above with respect to FIG. 1H, 5, 6A or 6B, for example.

The fluid includes large-size molecules 731 that cannot pass through the pores of the porous membrane and small-size molecules 733 that can pass through the pores. While the fluid passes through the porous membrane 710, the large-size molecules 731 are trapped or blocked by the porous membrane 710, and the small-size molecules 733 pass through the porous membrane 710. In this manner, the large-size molecules 731 can be separated from the small-size molecules 733.

Examples of chemical reactions that can employ the method shown in FIG. 7 include, but are not limited to, coupling reactions, such as the Heck coupling reaction or Suzuki coupling. The Heck reaction (also called the Mizoroki-Heck reaction) is the chemical reaction of an unsaturated halide (or triflate) with an alkene and a strong base and palladium catalyst to form a substituted alkene. The Suzuki reaction is the organic reaction of an aryl- or vinyl-boronic acid with an aryl- or vinyl-halide catalyzed by a palladium complex. In other embodiments, the method described above in connection with FIG. 7 can be employed in various drug manufacturing processes as a drug separating step.

In certain embodiments, the porous membranes described above or formed by the methods described above can be used for various other applications, such as but not limited to shape-selective catalysis and sorption of large organic molecules, guest-host chemistry and chromatographic separation.

In at least some of the aforesaid embodiments, any element used in an embodiment can interchangeably be used in another embodiment unless such a replacement is not feasible. It will be appreciated that the steps of the methods described above can be combined, divided, or omitted or that additional steps can be added. It will also be appreciated by those skilled in the art that various other omissions, additions and modifications may be made to the methods and structures described above without departing from the scope of the embodiments.

For purposes of this disclosure, certain aspects, advantages, and novel features of the embodiments are described herein. It is to be understood that not necessarily all such advantages may be achieved in accordance with any particular embodiment. Thus, for example, those skilled in the art will recognize that some embodiments may be embodied or carried out in a manner that achieves one advantage or group of advantages as taught herein without necessarily achieving other advantages as may be taught or suggested herein.

The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An apparatus comprising:
    a first layer having a thickness between about 100 nm to about 1 µm, the first layer including a plurality of first pores having a first diameter between 2 nm and about 50 nm, wherein the plurality of first pores permit fluid and/or molecules having a diameter smaller than the first diameter to pass through the first layer, wherein the first layer includes a first portion that includes the first pores, and wherein the first portion is formed of Mobile Crystalline Material (MCM)-41 or Santa Barbara Amorphous-15 SBA-15), and wherein the first layer further includes a plurality of second portions forming pillars penetrating the first layer, the second portions being non-porous; and
    a second layer attached to the first layer, the second layer including one or more second pores having a second diameter greater than the first diameter, wherein the one or more second pores are aligned to permit the fluid and/or molecules to pass from the first layer through the second layer.

2. The apparatus of claim 1, wherein the first layer includes a surface, and wherein the plurality of first pores extend in a direction substantially vertical to the surface.

3. The apparatus of claim 1, wherein the second diameter is equal to or greater than about 50 nm.

4. The apparatus of claim 1, wherein the pillars are arranged in a geometric pattern.

5. The apparatus of claim 4, wherein the geometric pattern comprises two or more rows of pillars.

6. The apparatus of claim 4, wherein the geometric pattern comprises two or more columns of pillars.

7. The apparatus of claim 4, wherein the geometric pattern comprises two or more diagonal lines of pillars.

8. The apparatus of claim 1, wherein the first pores have an inner surface, and wherein the apparatus further comprises molecules attached to the inner surface of the first pores.

9. The apparatus of claim 8, wherein the molecules comprise one or more selected from the group consisting of a polynucleotide, a polypeptide, a branched or unbranched C1-C30 alkyl group, and a compound comprising an alkoxide group.

10. The apparatus of claim 9, wherein the polynucleotide comprises a hairpin DNA.

11. The apparatus of claim 1, further comprising a conduit configured to flow a fluid through the first and second layers.

12. The apparatus of claim 1, wherein the first layer comprises calcine.

13. The apparatus of claim 12, wherein the second layer comprises calcine.

14. A method of separating molecules, the method comprising:
    flowing a fluid containing molecules of different sizes through the first and second layers of the apparatus of claim 1.

15. The method of claim 14, wherein the molecules of different sizes are produced by a coupling reaction.

* * * * *

UNITED STATES PATENT AND TRADEMARK OFFICE
CERTIFICATE OF CORRECTION

PATENT NO. : 8,511,483 B2  
APPLICATION NO. : 13/291935  
DATED : August 20, 2013  
INVENTOR(S) : Lee Page 1 of 1

It is certified that error appears in the above-identified patent and that said Letters Patent is hereby corrected as shown below:

On Title Page 2, in Item (56), under "OTHER PUBLICATIONS", in Column 1, Line 10, delete "File History for U.S. Appl. No. 12/202,000, filed Aug. 29, 2008.".

On Title Page 2, in Item (56), under "OTHER PUBLICATIONS", in Column 2, Line 18, delete "Cehmistry 2000; Chem" and insert -- Chemistry 2000; Chem. --, therefor.

On Title Page 2, in Item (56), under "OTHER PUBLICATIONS", in Column 2, Line 20, delete "Appl" and insert -- Appl. --, therefor.

On Title Page 2, in Item (56), under "OTHER PUBLICATIONS", in Column 2, Line 24, delete "Ethylenadiamine-Pyrocatechol-Water" and  
insert -- Ethylenediamine-Pyrocatechol-Water --, therefor.

In the Specification:

In Column 2, Line 4, delete "are, not" and insert -- are not --, therefor.

In Column 4, Line 60, delete "dimethol)" and insert -- dimethyl) --, therefor.

In Column 6, Line 9, delete "Commun," and insert -- Commun., -- therefor.

In Column 7, Line 65, delete "molecules 160" and insert -- molecules 170 --, therefor.

In the Claims:

In Column 11, Line 31, in Claim 1, delete "SBA-15)," and insert -- (SBA-15), --, therefor.

Signed and Sealed this  
Twenty-sixth Day of November, 2013

Margaret A. Focarino  
*Commissioner for Patents of the United States Patent and Trademark Office*